(12) United States Patent
Mayr et al.

(10) Patent No.: US 11,220,250 B2
(45) Date of Patent: Jan. 11, 2022

(54) HYDRAULIC BLOCK FOR A HYDRAULIC POWER BRAKE SYSTEM OF A VEHICLE

(71) Applicant: Robert Bosch GmbH, Stuttgart (DE)

(72) Inventors: Matthias Mayr, Rettenberg (DE); Andreas Weh, Sulzberg (DE); Juergen Tandler, Fuessen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/645,576

(22) PCT Filed: Jul. 12, 2018

(86) PCT No.: PCT/EP2018/068874
§ 371 (c)(1),
(2) Date: Mar. 9, 2020

(87) PCT Pub. No.: WO2019/052712
PCT Pub. Date: Mar. 21, 2019

(65) Prior Publication Data
US 2020/0282968 A1    Sep. 10, 2020

(30) Foreign Application Priority Data
Sep. 12, 2017 (DE) .......................... 102017216001.2

(51) Int. Cl.
*B60T 17/00* (2006.01)
*F15B 7/08* (2006.01)
*F16K 27/02* (2006.01)

(52) U.S. Cl.
CPC ................ *B60T 17/00* (2013.01); *F15B 7/08* (2013.01); *F16K 27/029* (2013.01)

(58) Field of Classification Search
CPC ........... B60T 17/00; F15B 7/08; F16K 27/029
See application file for complete search history.

(56) References Cited

U.S. PATENT DOCUMENTS

2007/0159002 A1   7/2007   Otomo et al.
2008/0174173 A1   7/2008   Kokubo et al.
(Continued)

FOREIGN PATENT DOCUMENTS

CN   101687496 A   3/2010
CN   203402178 U   1/2014
(Continued)

OTHER PUBLICATIONS

International Search Report for PCT/EP2018/068874, dated Oct. 1, 2018.

*Primary Examiner* — Eric Keasel
(74) *Attorney, Agent, or Firm* — Norton Rose Fulbright US LLP; Gerard Messina

(57) ABSTRACT

A hydraulic block for a hydraulic power vehicle brake system including a slip control. A bore, which communicates through a circumferential groove with a receptacle of a pedal travel simulator, is run through parallel to a motor side of the hydraulic block between the motor side and a master brake cylinder bore in the hydraulic block and is connected through a transverse bore with a further bore parallel to the motor side, which connects the master brake cylinder bore with a connection for a pressureless brake fluid reservoir, which is attachable to the hydraulic block. The bores form a return of the pedal travel simulator, which has a low resistance to flow and allows for a closed system.

14 Claims, 1 Drawing Sheet

(56) References Cited

U.S. PATENT DOCUMENTS

| | | | | |
|---|---|---|---|---|
| 2012/0177516 A1* | 7/2012 | Mayr | ................... | F04B 39/127 |
| | | | | 417/437 |
| 2014/0345720 A1* | 11/2014 | Alaze | ................... | B60T 13/686 |
| | | | | 137/561 A |
| 2015/0298675 A1* | 10/2015 | Mayr | ................... | B60T 8/4081 |
| | | | | 92/169.1 |

FOREIGN PATENT DOCUMENTS

| | | | |
|---|---|---|---|
| CN | 106458179 A | 2/2017 | |
| DE | 102014213732 A1 | 1/2016 | |
| DE | 102014215308 A1 | 2/2016 | |
| DE | 102014215311 A1 | 2/2016 | |
| JP | 2010096008 A | 4/2010 | |
| KR | 20010032090 A | 4/2001 | |
| WO | 2013023953 A1 | 2/2013 | |
| WO | 2017137135 A1 | 8/2017 | |

\* cited by examiner

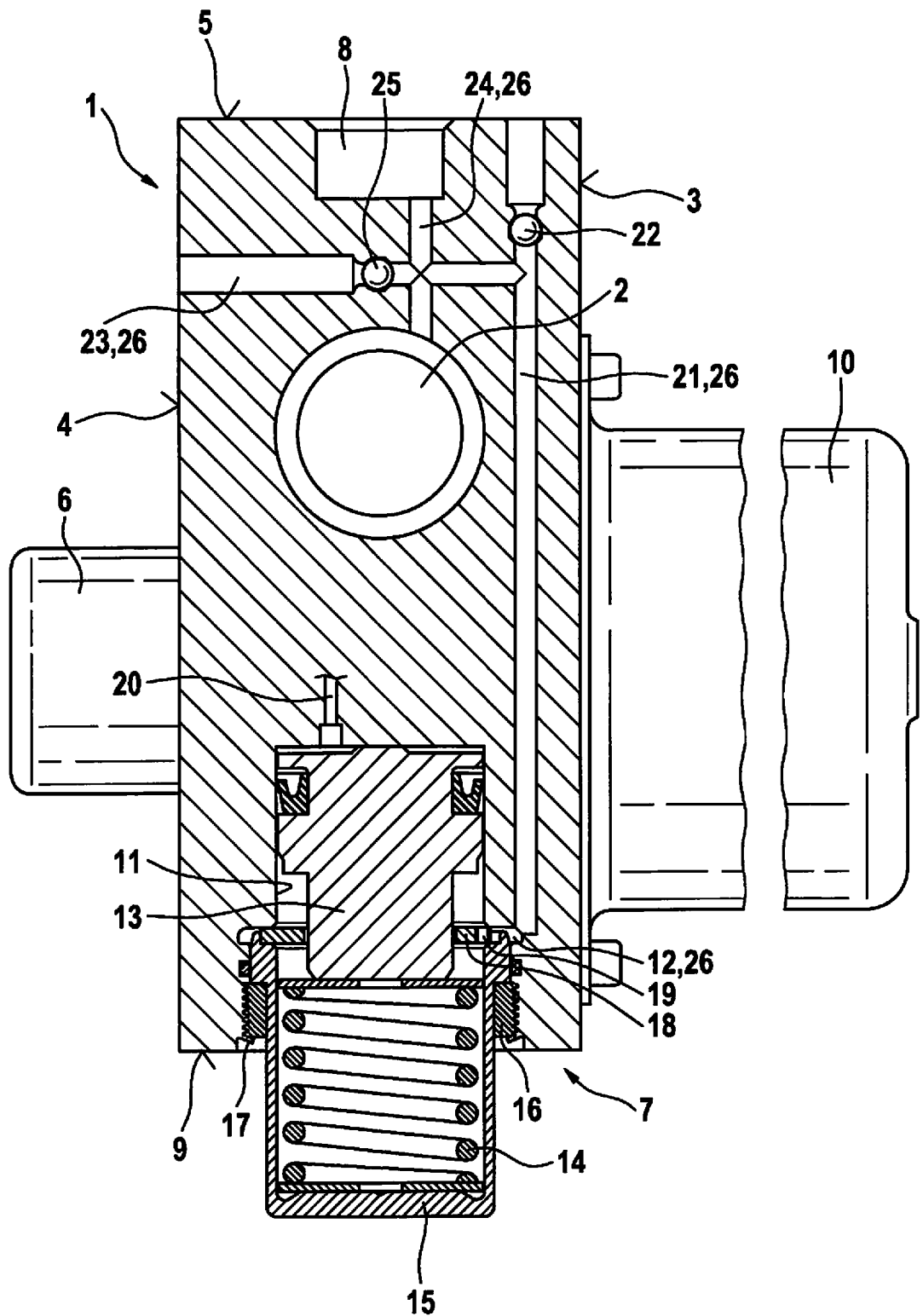

HYDRAULIC BLOCK FOR A HYDRAULIC POWER BRAKE SYSTEM OF A VEHICLE

FIELD

The present invention relates to a hydraulic block for a hydraulic power brake system of a vehicle.

BACKGROUND INFORMATION

International Patent Application NO. WO 2013/023 953 A1 describes a brake operating unit for a hydraulic power brake system of a vehicle having a rectangular parallelepiped-shaped housing, which includes a master brake cylinder bore, a power cylinder bore, a connection for a brake fluid reservoir and a receptacle for a pedal travel simulator.

SUMMARY

An example hydraulic block according to the present invention is provided for a hydraulic power brake system of a vehicle and includes a connection for a brake fluid reservoir, a master brake cylinder bore and a receptacle for a pedal travel simulator. The example hydraulic block according to the present invention preferably has further receptacles and bores for further hydraulic components of the vehicle brake system such as for example receptacles for solenoid valves of a brake pressure control for power braking and/or a slip control, and connections for brake lines that lead to hydraulic wheel brakes.

The connection for the brake fluid reservoir is in particular a cylindrical, possibly diametrically-stepped blind hole, into which a connecting nipple of the brake fluid reservoir is inserted. The brake fluid reservoir is for example a pressureless brake fluid reservoir, as in conventional master brake cylinders, on which it is attached.

The master brake cylinder bore is in particular a cylindrical through-hole or blind hole in the hydraulic block according to the present invention, which is provided for accommodating a master brake cylinder or which forms the master brake cylinder, into which a or multiple master brake cylinder pistons are inserted in an axially displaceable manner. The master brake cylinder bore preferably has cross-sectional or diametrical steps and/or circumferential grooves.

The receptacle for the pedal travel simulator is an in particular cylindrical through-hole or blind hole in the hydraulic block according to the present invention, which is provided for accommodating a pedal travel simulator. The pedal travel simulator is a pressure-resistant hydraulic accumulator for brake fluid, which is in particular spring-loaded, air pressure-loaded or gas pressure-loaded. The hole forming the receptacle for the pedal travel simulator in the hydraulic block according to the present invention may be a part of the pedal travel simulator, for example a cylinder for accommodating an axially displaceable simulator piston. It is also possible for a cylinder or another, in particular pressure-resistant container of the pedal travel simulator to be situated in, for example pressed into, the receptacle of the hydraulic block.

The example hydraulic block according to the present invention has a return for the pedal travel simulator, which connects the connection for the brake fluid reservoir, the master brake cylinder bore and the receptacle for the pedal travel simulator. The return communicates with a back side of a simulator piston, that is, with the side of a simulator piston that does not communicate with the master brake cylinder. Generally, the return communicates with an interior of the pedal travel simulator, whose volume is reduced in an operation of a master brake cylinder and from which brake fluid is displaced in an operation of the master brake cylinder. The brake fluid displaced from the pedal travel simulator in an operation of the master brake cylinder flows through the return into the brake fluid reservoir. The return allows for a closed system, that is to say, it is neither necessary for the back side of the pedal travel simulator to communicate with an environment nor to contain a compressible medium.

The return of the hydraulic block according to the present invention has (at least) three bores, of which two are disposed parallel to each other and parallel to the receptacle for the pedal travel simulator in the hydraulic block, while one connects the two parallel bores as a cross bore. One of the two parallel bores communicates with the receptacle for the pedal travel simulator and the other of the two parallel bores communicates with the connection for the brake fluid reservoir. To "communicate" means that the two parallel bores open out directly into the receptacle for the pedal travel simulator or into the connection for the brake fluid reservoir or that they communicate indirectly through one or even several additional bores, grooves or the like with the receptacle for the pedal travel simulator or the connection for the brake fluid reservoir. One of the three bores of the return, in particular the cross bore, communicates with the master brake cylinder bore in that it intersects for example the master brake cylinder bore or a circumferential groove of the master brake cylinder bore or penetrates the master brake cylinder bore.

The present invention allows for a return of the pedal travel simulator in the hydraulic block that has a low resistance to flow.

A bore in the sense of the present invention is an—in particular cylindrical, also cross-sectionally or diametrically stepped—through-hole or blind hole regardless of the manner of its production. A bore in the sense of the present invention may thus also be produced in a manner other than by drilling, by cutting or without cutting.

Advantageous embodiments and refinements of the present invention are described herein.

BRIEF DESCRIPTION OF THE DRAWINGS

The present invention is explained in greater detail below on the basis of one specific example embodiment illustrated in the FIGURE.

The FIGURE shows a cross section of a hydraulic block according to the present invention of a hydraulic power brake system of a vehicle having a slip control in an axial plane of a pedal travel simulator.

DETAILED DESCRIPTION OF EXAMPLE EMBODIMENTS

The hydraulic block 1 according to the present invention shown in the FIGURE is provided for a brake pressure control in a power operation and for a slip control of a hydraulic power brake system of a vehicle (not shown). Hydraulic block 1 is a rectangular parallelepiped-shaped metal block, which is drawn as partially fitted with components. In the illustrated and described specific embodiment, hydraulic block 1 is made of light metal, that is, an aluminum alloy. Hydraulic block 1 has bores, not visible in the FIGURE, in accordance with a hydraulic circuit layout of the vehicle brake system. The bores of hydraulic block 1 are arranged in a Cartesian manner, i.e., bores are parallel and/or at right angles with respect to one another and to the outer surfaces and edges of hydraulic block 1. It is possible for one or multiple bore(s) to be produced in hydraulic block 1 not in a Cartesian manner, but rather diagonally. "Bores" in the sense of the present invention may be produced in hydraulic block 1 by drilling or in another manner in cutting or non-cutting fashion. For a pressure-tight closure, it is possible to press balls 22, 25 into the openings of bores on the outer sides of hydraulic block 1.

Hydraulic block 1 has a cylindrical master brake cylinder bore 2, which may have diametrical steps and/or circumferential grooves. Master brake cylinder bore 2 is situated in a center plane at a center between two large outer sides and near and parallel to a transverse side of hydraulic block 1. The two large sides of hydraulic block 1 are designated here as motor side 3 and as control unit side 4, and the transverse side as connection side 5. "Near" means a distance of approximately 1-1.5 times a diameter of master brake cylinder bore 2 and less than a thickness of hydraulic block 1. Master brake cylinder bore 2 forms a master brake cylinder of hydraulic block 1, in which for a dual-circuit vehicle brake system two master brake cylinder pistons, that is, a so-called primary or rod piston and a so-called secondary or floating piston, are situated in an axially displaceable manner. To operate the master brake cylinder and the vehicle brake system, the primary or rod piston is displaced in master brake cylinder bore 2 by muscle power via a piston rod and a foot brake pedal or a hand brake lever. A master brake cylinder pressure produced in this manner displaces the secondary or floating piston. This is conventional and requires no further explanation.

Hydraulic block 1 is fitted with hydraulic components for a brake pressure control during power braking and for slip control such as solenoid valves, the master brake cylinder pistons, a power cylinder 6 and a pedal travel simulator 7, which are hydraulically interconnected in accordance with the hydraulic circuit layout of the vehicle brake system. Because the master brake cylinder is integrated into hydraulic block 1, hydraulic wheel brakes only have to be connected to hydraulic block 1 via brake lines. Such hydraulic blocks 1 are conventional and are not explained further here.

On the connection side 5, hydraulic block 1 has cylindrical blind holes as connections 8 for a pressureless brake fluid reservoir (not shown), as in conventional master brake cylinders. The brake fluid reservoir has connecting nipples, which, sealed by sealing rings, are inserted in connections 8. From a bottom of each connection 8 for the brake fluid reservoir, bores 24 run parallel to motor side 3, to control unit side 4 and to the long sides of hydraulic block 1 into master brake cylinder bore 2.

Hydraulic block 1 has a cylindrical hole, which as the power cylinder bore passes through hydraulic block 1 perpendicularly with respect to motor side 3 and control unit side 4. The power cylinder bore is located between master brake cylinder bore 2 and a transverse side 9 of hydraulic block 1 opposite connection side 5. Power cylinder 6 is pressed into the power cylinder bore, power cylinder 6 protruding from hydraulic block 1 on the control unit side 4. On control unit side 4, an electronic control unit (not shown) is attached for controlling the brake pressure when power braking and for slip control. In addition, valve domes of the solenoid valves protrude from the control unit side 4 of hydraulic block 1 when hydraulic block 1 is fitted with components.

On the opposite motor side 3, an electric motor 10 is attached on hydraulic block 1 coaxially with respect to the power cylinder bore, which displaces a power piston in power cylinder 6 via a planetary gear (not shown) as a reduction gear and a ball screw (likewise not shown) and thereby produces a brake pressure.

On the transverse side 9 opposite connection side 5, hydraulic block 1 has a cylindrical blind hole as a receptacle 11 for pedal travel simulator 7. Receptacle 11 of pedal travel simulator 7 is diametrically stepped and has a circumferential groove 12, which may also be regarded as an undercut of receptacle 11 of pedal travel simulator 7. Receptacle 11 forms a cylinder of pedal travel simulator 7, in which a simulator piston 13 is accommodated in an axially displaceable manner, which is loaded by a coil spring as simulator spring 14 in the direction of a bottom of the blind hole forming the receptacle 11 and the cylinder of pedal travel simulator 7. Simulator spring 14 is supported in a cup-shaped simulator lid 15, which is inserted into receptacle 11 of pedal travel simulator 7 and which extends to circumferential groove 12. Simulator lid 15 is retained in receptacle 11 of pedal travel simulator 7 by a threaded ring 16, which in the manner of a sleeve nut is screwed into an internal screw thread at an opening of receptacle 11 and is secured against release by caulking 17. Circumferential groove 12 accommodates a perforated disk 18, which limits a travel of simulator piston 13. Via clearances 19 in an outer edge of perforated disk 18, receptacle 11, which forms the cylinder of pedal travel simulator 7, communicates with the circumferential groove 12, which surrounds receptacle 11 and is open inwardly toward receptacle 11.

A bore 20, which connects receptacle 11 of pedal travel simulator 7 with master brake cylinder bore 2, leads to a bottom of receptacle 11 forming the cylinder of pedal travel simulator 7. Bore 20 accommodates a solenoid valve (not shown) as simulator valve, which is opened during a power braking action to allow brake fluid to be displaced from master brake cylinder into the receptacle 11, forming the cylinder, of pedal travel simulator 7. During a power braking action, a brake pressure is produced by electric motor 10 in power cylinder 6. The master brake cylinder communicates through bore 20 with a front side of simulator piston 13 facing the bottom of receptacle 11 of pedal travel simulator 7, whereas the groove 12 surrounding the receptacle 11 of pedal travel simulator 7 communicates with a back side of simulator piston 13.

From circumferential groove 12 of receptacle 11 of pedal travel simulator 7, a bore 21 runs axially parallel to receptacle 11 of pedal travel simulator 7 and parallel to motor side 3, to control unit side 4 and to the long sides of hydraulic block 1 to connection side 5, where it is closed in a pressure-tight manner by a press-fit ball 22. In the described and illustrated specific embodiment of the present invention, bore 21 passes through near motor side 3 between motor side 3 and master brake cylinder bore 2.

A transverse bore 23 opens into bore 21 coming from groove 12 of receptacle 11 of pedal travel simulator 7 between connection 8 for the brake fluid reservoir in connection side 5 of hydraulic block 1 and master brake cylinder bore 2. Transverse bore 23 is disposed in hydraulic block 1 perpendicularly to motor side 3 and to control unit side 4, it intersects bore 24, which connects connection 8 for the brake fluid reservoir with master brake cylinder bore 2, and is closed on the control unit side 4 in a pressure-tight manner by press-fit ball 25.

Like bore 21, bore 24, which connects connection 8 with master brake cylinder bore 2, runs axially parallel to receptacle 11 of pedal travel simulator 7 and parallel to motor side 3, to control unit side 4 and to the long sides of hydraulic block 1. These two bores 21, 24 are therefore also designated here as parallel bores 21, 24. They are offset in parallel to each other. The two parallel bores 21, 24 are part of a return 26 of pedal travel simulator 7, which connects the receptacle 11 forming the cylinder of pedal travel simulator 7 on the back side of simulator piston 13 with the connection 8 of the pressureless brake fluid reservoir (not shown). In addition to the two parallel bores 21, 24, return 26 also includes transverse bore 23 and groove 12. Return 26 allows for a closed system.

What is claimed is:

1. A hydraulic block comprising:
   a first receptacle bore;
   a master brake cylinder bore arranged lower than the first receptacle bore;
   a second receptacle bore arranged lower than the master brake cylinder;
   a first pipe that is above the master brake cylinder, extends from the first receptacle bore, and via which fluid is deliverable from the first receptacle bore to the master brake cylinder bore;
   a second pipe that is arranged lower than the master brake cylinder, extends from the master brake cylinder bore, and via which the fluid is deliverable from the master brake cylinder to the second receptacle bore;
   a third pipe that is parallel to the first pipe, extends from lower than the master brake cylinder to higher than the master brake cylinder, and is hydraulically connected to the second receptacle bore; and
   a fourth pipe the extends transversely to, and hydraulically connects, the first and third pipes, wherein the fluid is returnable from the second receptacle bore to the first receptacle bore without passing back through the master brake cylinder via a return path from the second receptacle bore to the third pipe, from the third pipe to the fourth pipe, from the fourth pipe back to the first pipe, and from the first pipe back to the first receptacle bore.

2. The hydraulic block as recited in claim 1, wherein the second receptacle bore has an undercut or a groove that opens into the second pipe.

3. The hydraulic block as recited in claim 1, wherein respective opening ends of the first receptacle bore and the second receptacle are at respective opposite surfaces of the hydraulic block.

4. The hydraulic block as recited in claim 1, wherein the hydraulic block is a rectangular parallelepiped and the bores and pipes are arranged in a Cartesian pattern.

5. The hydraulic block as recited in claim 1, wherein the master brake cylinder bore runs transversely relative to the first receptacle bore and/or the second receptacle bore.

6. The hydraulic block as recited in claim 1, further comprising a power cylinder bore.

7. The hydraulic block as recited in claim 1, wherein the first pipe includes a first section above a connection point at which the fourth pipe connects to the first pipe and a second section that is below the connection point.

8. The hydraulic block as recited in claim 1, wherein the fourth pipe includes (a) a first section extending between the third pipe and a connection point at which the fourth pipe connects to the first pipe and (b) a second section that is on an opposite side of the connection point than the first section.

9. The hydraulic block as recited in claim 8, further comprising a ball arranged in the second section.

10. The hydraulic block as recited in claim 1, wherein the third pipe includes (a) a first section extending from lower than the master brake cylinder bore to a connection point at which the third pipe connects to the fourth pipe higher than the master brake cylinder bore and (b) a second section extending upwards from the connection point.

11. The hydraulic block as recited in claim 10, wherein further comprising a ball arranged in the second section.

12. The hydraulic block as recited in claim 1, further comprising a pedal travel simulator arranged in the second receptacle bore.

13. The hydraulic block as recited in claim 12, wherein the second receptacle bore includes a first region and a second region that is wider than the first region, thereby forming an undercut, the pedal travel simulator includes a simulator piston and a perforated disk arranged in the undercut, and the second receptacle bore is hydraulically connected to the third pipe via the undercut.

14. The hydraulic block as recited in claim 1, wherein the first receptacle bore and the second receptacle bore form blind holes.

* * * * *